(12) United States Patent
Kresse

(10) Patent No.: US 10,767,461 B2
(45) Date of Patent: Sep. 8, 2020

(54) ADDITIVE INJECTION SYSTEM

(71) Applicant: HALLIBURTON ENERGY SERVICES, INC., Houston, TX (US)

(72) Inventor: Frank Kresse, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/343,984

(22) PCT Filed: Nov. 23, 2016

(86) PCT No.: PCT/US2016/063466
§ 371 (c)(1),
(2) Date: Apr. 22, 2019

(87) PCT Pub. No.: WO2018/097824
PCT Pub. Date: May 31, 2018

(65) Prior Publication Data
US 2019/0330967 A1 Oct. 31, 2019

(51) Int. Cl.
| | |
|---|---|
| *E21B 43/26* | (2006.01) |
| *E21B 43/14* | (2006.01) |
| *B01F 3/12* | (2006.01) |
| *E21B 21/06* | (2006.01) |
| *F16L 41/16* | (2006.01) |

(52) U.S. Cl.
CPC .............. *E21B 43/26* (2013.01); *E21B 43/14* (2013.01); *B01F 3/1271* (2013.01); *B01F 2215/0081* (2013.01); *E21B 21/062* (2013.01); *F16L 41/16* (2013.01)

(58) Field of Classification Search
CPC ........ E21B 43/26; E21B 43/14; E21B 21/062; B01F 3/1271; B01F 2215/0081; F16L 41/16

USPC ....................................................... 166/308.1
See application file for complete search history.

(56) References Cited

U.S. PATENT DOCUMENTS

| | | | |
|---|---|---|---|
| 4,427,133 A * | 1/1984 | Kierbow | G01F 11/24 222/135 |
| 4,542,162 A | 9/1985 | Rutherford et al. | |
| 2012/0272838 A1* | 11/2012 | LeBlanc | B01F 3/1221 100/37 |
| 2015/0107822 A1 | 4/2015 | Tudor | |
| 2015/0204166 A1 | 7/2015 | Sanborn et al. | |

(Continued)

FOREIGN PATENT DOCUMENTS

| | | |
|---|---|---|
| WO | 2010139938 A2 | 12/2010 |
| WO | 2015076784 A1 | 5/2015 |

OTHER PUBLICATIONS

International Search Report and Written Opinion of the International Searching Authority dated Aug. 14, 2017, issued in corresponding PCT Application No. PCT/US2016/063466.

*Primary Examiner* — Matthew R Buck
*Assistant Examiner* — Patrick F Lambe
(74) *Attorney, Agent, or Firm* — McAfee & Taft

(57) ABSTRACT

An additive injection apparatus has a flow manifold with an injection tube configured to communication an additive into the flow manifold. A hopper is connected to the injection tube and will deliver the additive to the injection tube. First and second valves movable between open and closed positions control the flow of additive from the hopper into the injection tube and from the injection tube into the flow manifold.

15 Claims, 9 Drawing Sheets

(56) References Cited

U.S. PATENT DOCUMENTS

2015/0322761 A1 11/2015 Hodgson et al.
2016/0084044 A1 3/2016 Shen et al.

\* cited by examiner

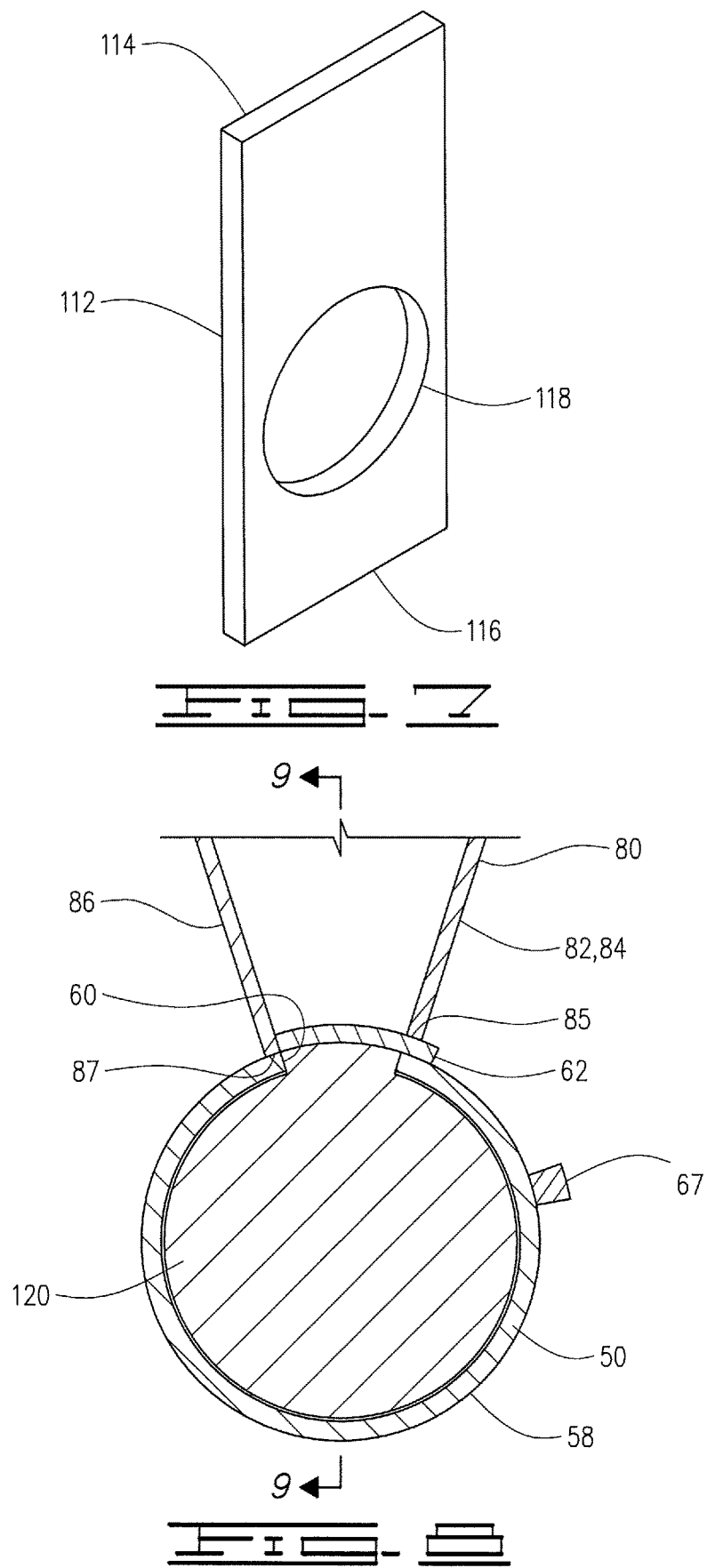

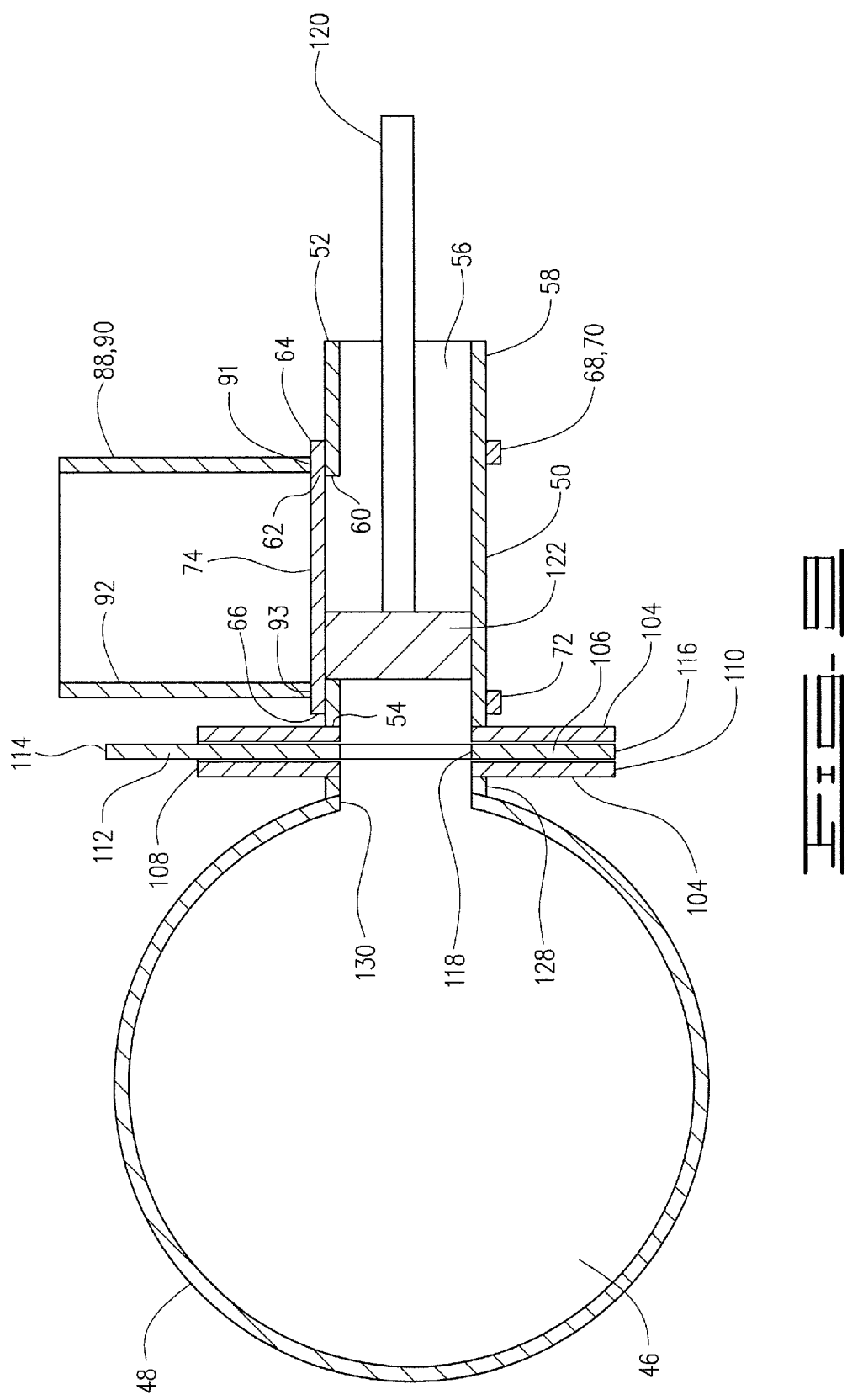

ADDITIVE INJECTION SYSTEM

BACKGROUND

In the production of oil and gas, it is often necessary to pump well treatment fluids into the well. The treatment fluids delivered into the well are generally mixed at the surface. Treatment processes in which treatment fluids are utilized include hydraulic stimulation or fracturing. Fracturing is a technique utilized to release petroleum, natural gas or other substances from reservoir rock formations. The fracturing fluid will normally include a number of different components, both liquid and solid, or dry material. The fluid pumped down into the well and prepared at the surface requires a number of different pieces of equipment. For example, blenders, mixers, pumps, storage vessels and other types of equipment are typically used to blend and pump the fluid into the well.

SUMMARY

An additive injection apparatus according to the current disclosure has a flow manifold with an injection tube configured to communicate an additive into the flow manifold. An additive hopper is connected to the injection tube. A first valve which is movable between open and closed positions is included. When in the open position the first will allow additive to be communicated from the additive hopper to the injection tube. A second valve which is also movable between open and closed positions is included. The second valve may be a reciprocal or other type of valve movable between the open and closed positions so that when in the open position additive from the injection tube may be communicated into the flow manifold.

A reciprocable plunger is disposed in the injection tube. The reciprocable plunger is movable from a retracted to an inserted position. When the reciprocable plunger moves to the inserted position additive will be injected from the injection tube into the flow manifold.

The injection tube may have a slot defined therein to receive additive communicated from the hopper. The first valve will move between open and closed positions so that in the open position the slot is uncovered and in the closed position the slot is covered. The second valve, which may be a reciprocating gate valve, is movable between the closed position in which no additive can be moved into the flow manifold and an open position so that the plunger can urge additive from the injection tube into the flow manifold. The fluid from the flow manifold with the additive mixed therein which may be for example a dry additive, liquid or gel will pass through an outlet end of the flow manifold into pumps or other equipment where it will ultimately be pumped into a well. An interior of the injection tube may be positioned at an angle from the central flow passage of the flow manifold and may be for example about 90°.

BRIEF DESCRIPTION OF THE FIGURES

FIG. 7 is a view of the knife gate valve plate.

FIG. 8 is a cross section through line 8-8 on FIG. 3.

FIG. 9 is a cross section through line 9-9 on FIG. 8.

DESCRIPTION OF THE EMBODIMENT

Figure 1:
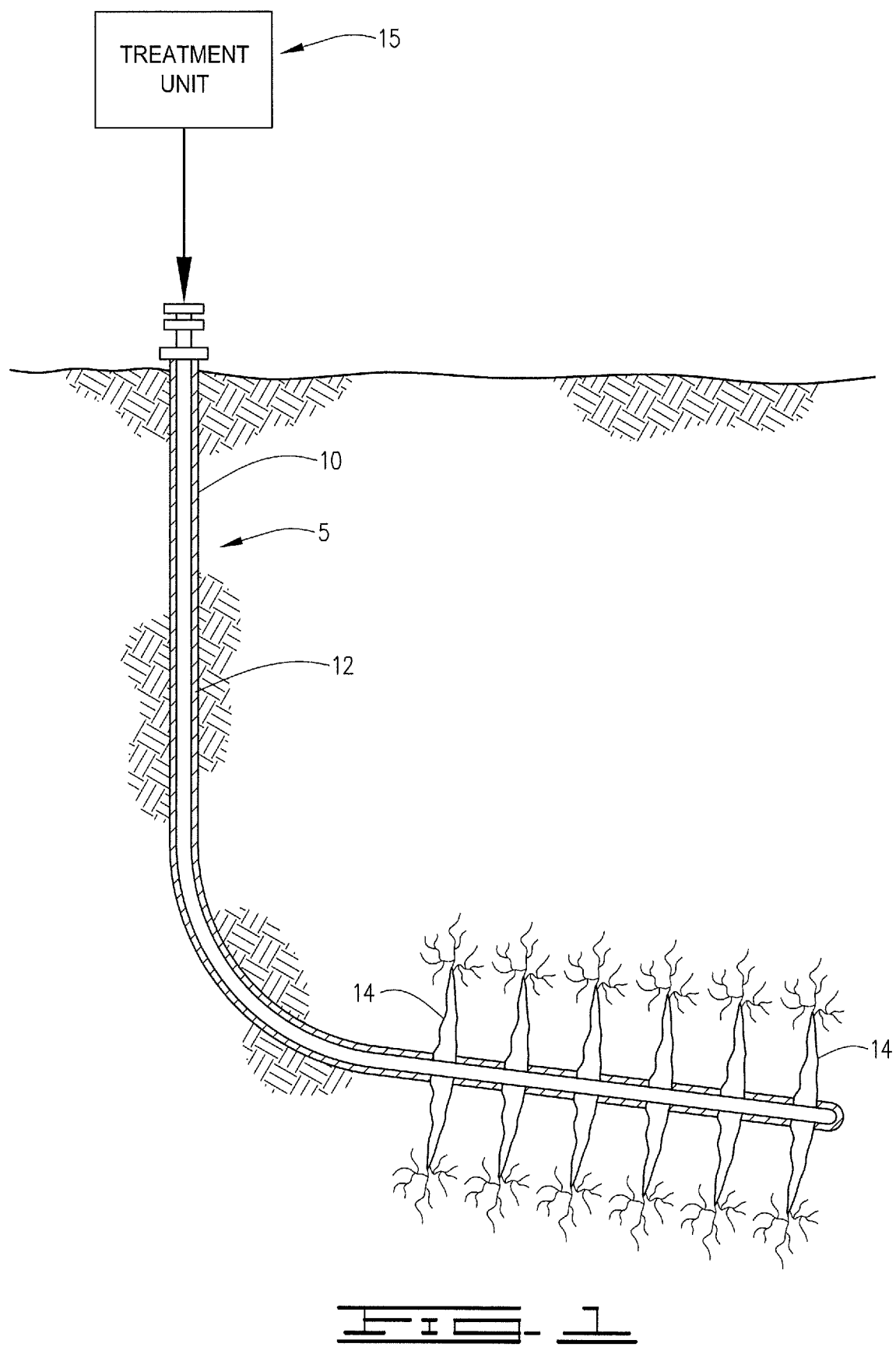
FIG. 1 schematically shows a wellbore drilled into the earth.

Referring to the drawings, FIG. 1 shows a well 5 comprising a wellbore 10 and a casing 12. Well 5 is drilled into the earth to intersect a formation and to produce hydrocarbons therefrom. Although the discussion here refers to a cased well, it is understood that this disclosure herein is not limited to cased wells but also includes uncased wells. Well 5 intersections one or more zones, or formations from which hydrocarbons may be produced. FIG. 1 schematically shows a well in which intersected zone(s) have been perforated and have fractures 14.

Figure 2:
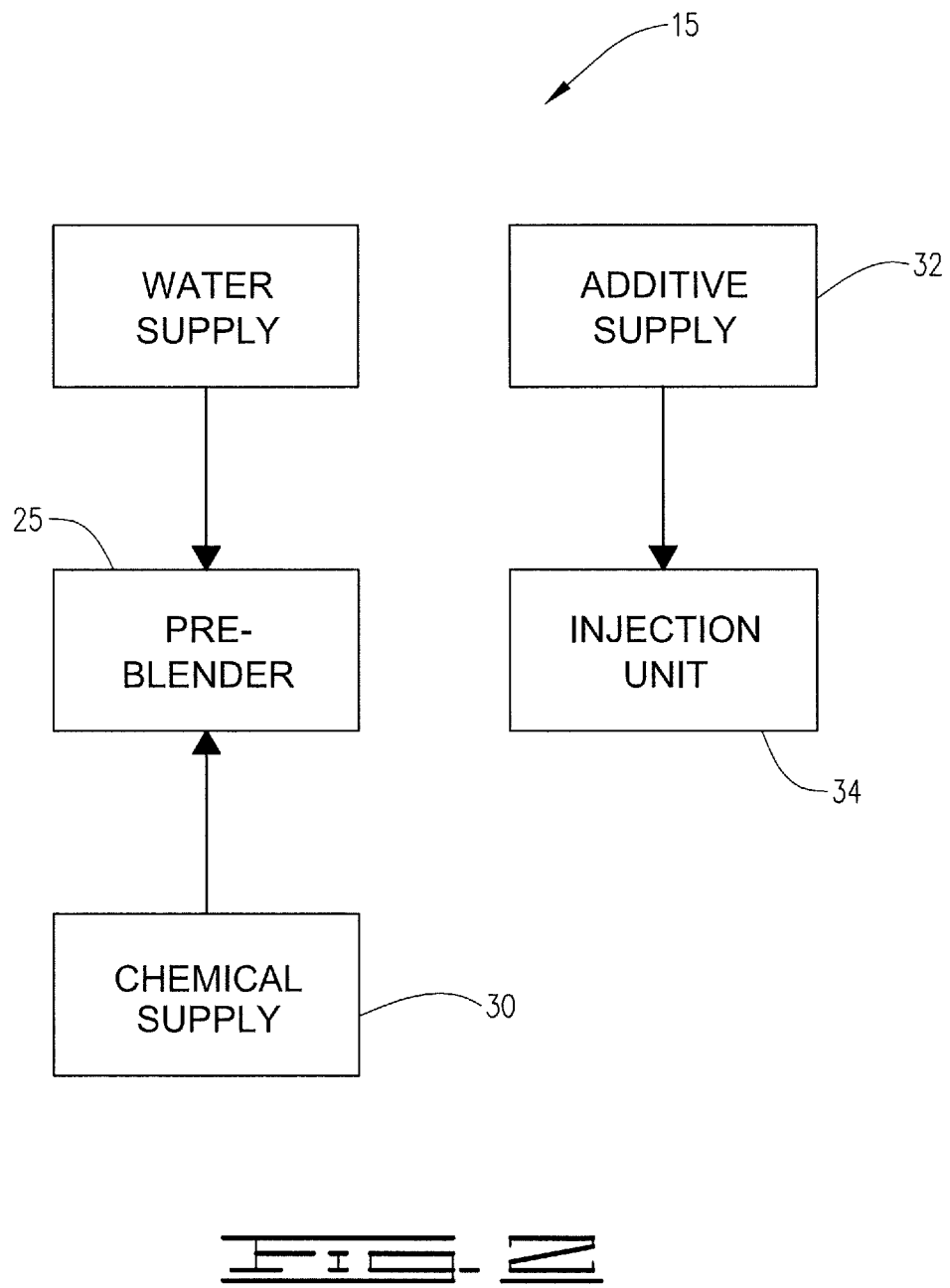
FIG. 2 is a block diagram of exemplary equipment, including an additive injection apparatus.

Units utilized to mix or blend fluid for well treatment, such as fracturing, typically include a significant number of pieces of equipment. A block diagram of an exemplary portion of a treatment unit 15 is shown in FIG. 2. The treatment unit in the example described herein is a fracturing unit that may include a water supply 20, a preblender 25, a chemical supply 30, an additive storage unit or supply 32 and the additive injection apparatus 34. The additive injection apparatus 34 will mix fluid coming from preblender 25 and the additive sufficiently such that a complicated or larger piece of equipment like a mixer which may normally be used is not required. Although a water supply, chemicals and a preblender are shown, it is understood that any desired fluid may be provided to the additive injection system 34 and mixed therein with proppant or other additive from additive supply 32.

In the described embodiment, the preblender 25 will receive water from water supply 20 and dry powder (for example, guar) or liquid gel concentrate that can be metered from a storage tank into the preblender fluid stream. The powder or liquid gel is mixed with water and blended with various chemical additives and modifiers provided by the chemical supply 30. The chemicals can include any number of chemicals such as, for example, cross linkers, gelling agents, viscosity altering chemicals, pH buffers, modifiers, surfactants, breakers and stabilizers. The mixture will be fed into the hydration device of preblender 25. The fluid stream from preblender 25 is then fed into the additive injection system 34 and mixed with an additional additive provided from an additive supply. The additive may be a proppant to be mixed with the fluid from the preblender 25. The fluid exiting the additive injection apparatus 34 will ultimately be pumped into wells and utilized to fracture or perform other treatment.

Figure 3:
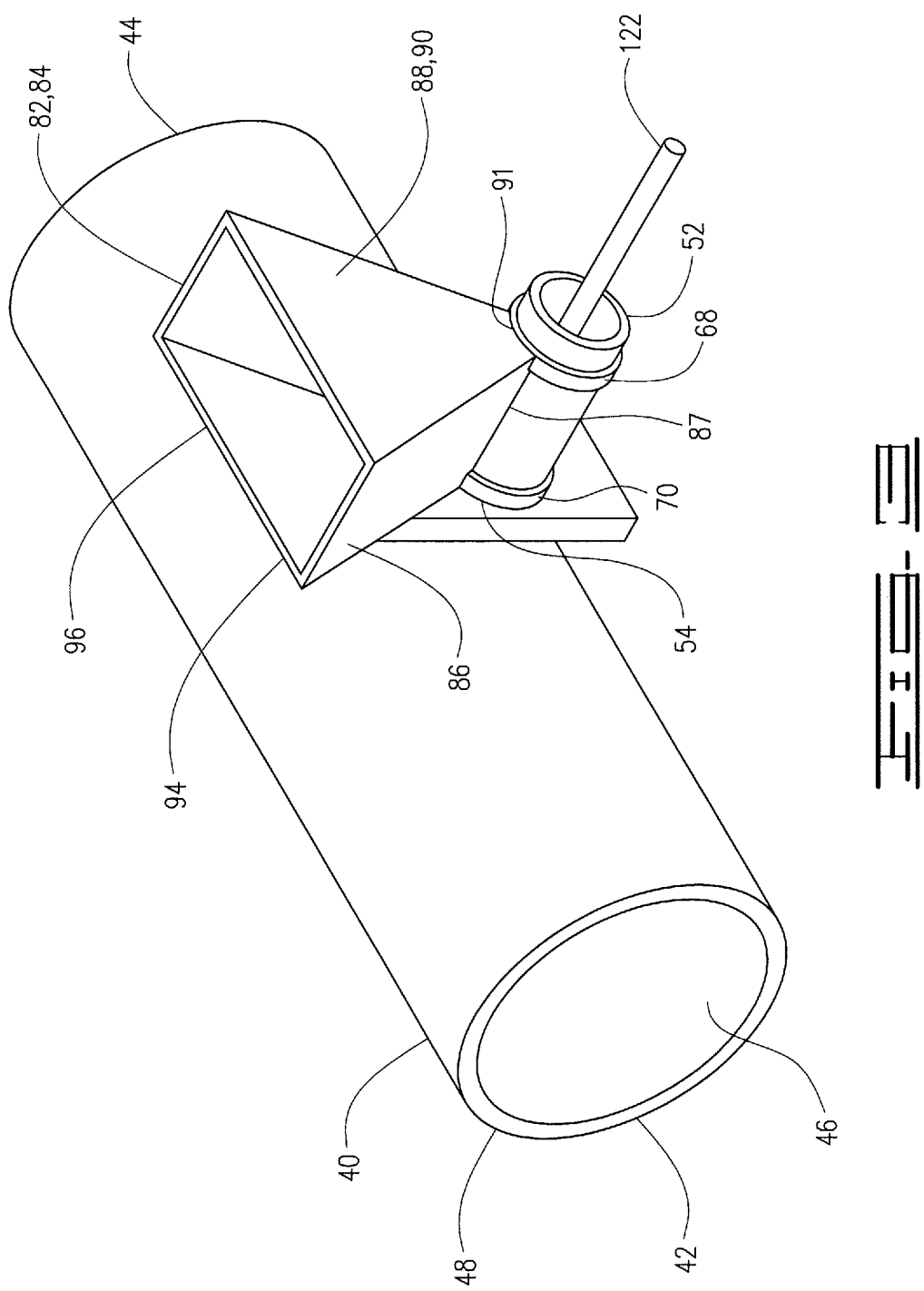
FIG. 3 is a perspective view of the additive injection apparatus.
Figure 4:
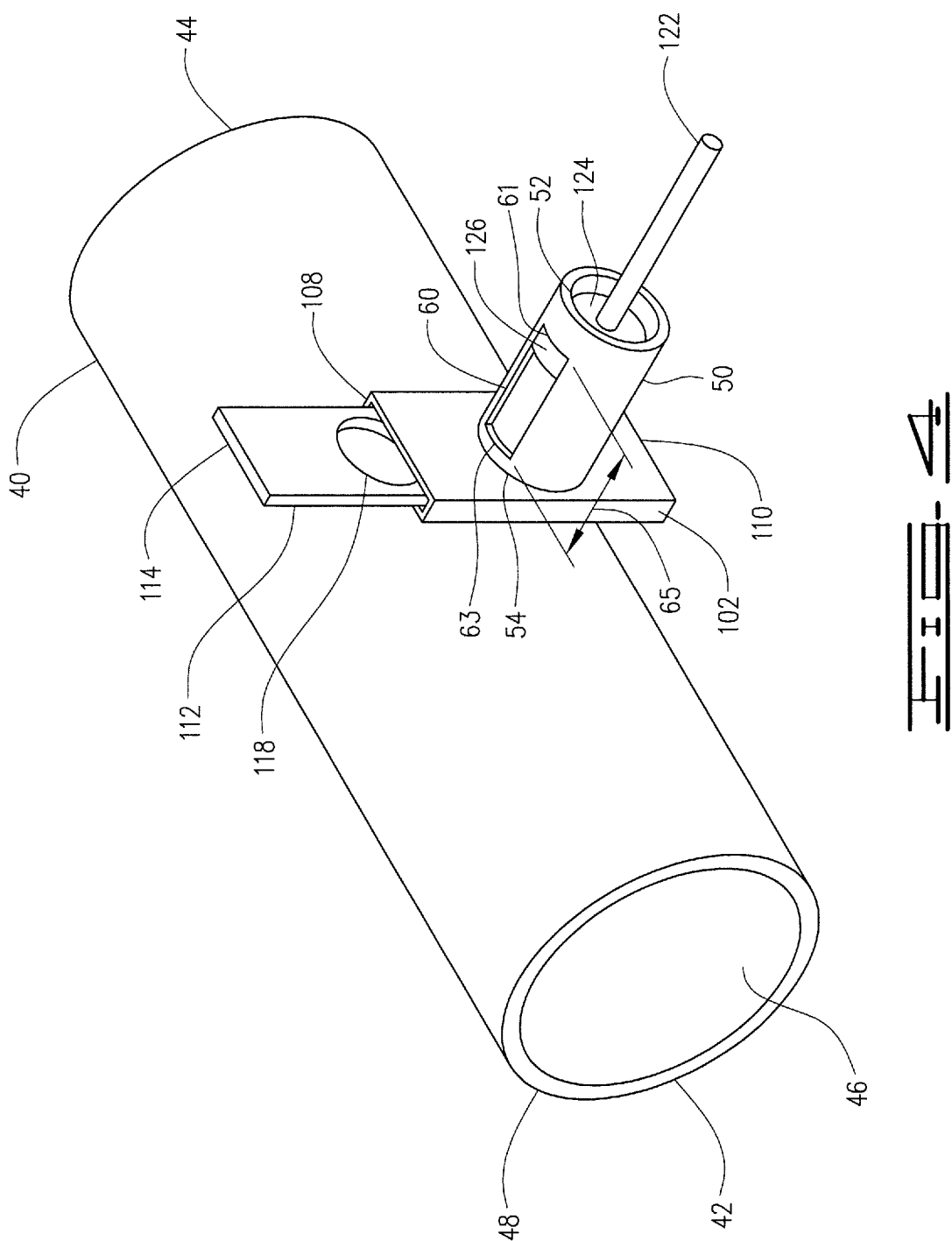
FIG. 4 is a view identical to that shown in FIG. 3 with components not shown for clarity.
Figure 5:
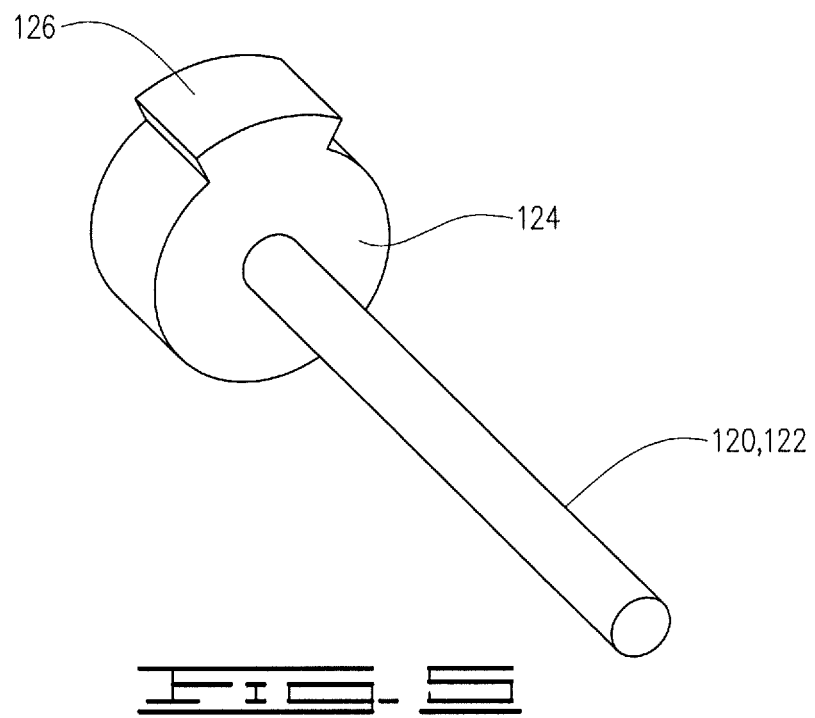
FIG. 5 is a view of a plunger utilized with the current invention.
Figure 6:
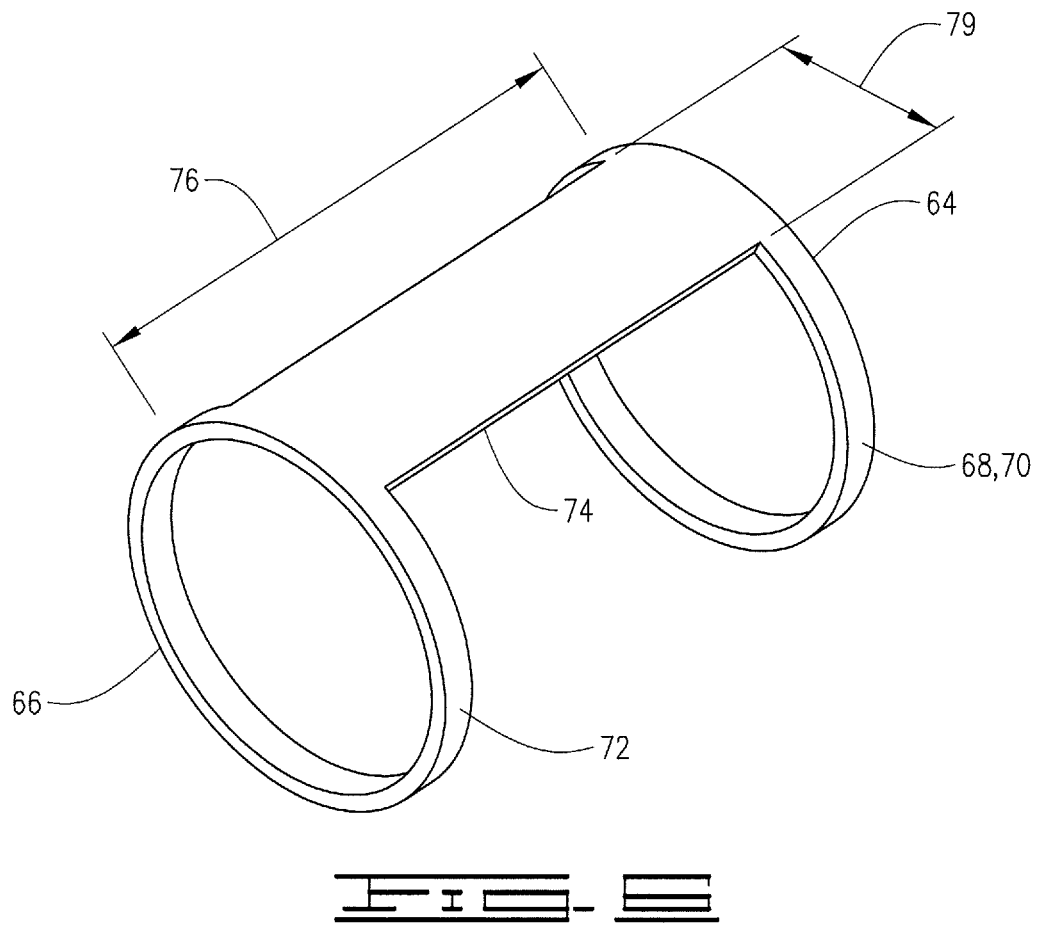
FIG. 6 is a view of a rotating gate valve.

Referring now to FIG. 3, additive injection apparatus 34 comprises a flow manifold 40 with an inlet end 42 and an outlet end 44. In the disclosure described herein, inlet end 42 will receive fluid from the preblender 25. The mix of the additive from additive supply 32 and fluid from preblender 25 will be delivered through outlet end 44 to pumps that will ultimately deliver the fluid into well 5. Flow manifold 40 comprises a central flow passage 46 and is generally cylindrical with an outer wall 48.

Additive injection apparatus 34 includes an injection tube 50 with first and second ends 52 and 54. Injection tube 50 is generally cylindrical and comprises an injection tube interior. In the current disclosure, injection tube interior, or injection tube flow passage 56 is positioned at a generally 90° angle to central flow passage 46 of flow manifold 40. In such a configuration, and as will be explained in more detail, urging the additive from the injection tube 50 into the flow manifold 40 at about a 90° angle will typically ensure the additive is injected from the injection tube 50 into the fluid flowing through flow manifold 40. It is understood, however, that it is not necessary or required for the injection tube interior to be at a 90° angle and may be positioned at any angle that would provide for injection of the additive into the fluid flowing through flow manifold 40. Generally cylindrical injection tube 50 has outer wall 58. A slot 60, which is a generally longitudinal slot 60, may be defined in the outer wall 58 of injection tube 50. Additive will be delivered to the injection tube interior through slot 60. Slot 60 has ends 61 and 63, which define a length 65 therebetween.

Additive injection apparatus 34 includes a valve 62 which may comprise rotatable gate valve 62. Rotatable gate valve 62 has first end 64 and second end 66. Rings 68 are positioned at first and second ends 64 and 66 and comprise first ring 70 and second ring 72. A shield 74 extends between and is connected to first and second rings 70 and 72. Shield 74 has a length 76 which is sufficient to span the length 65 of longitudinal slot 60. Slot 60 has a width 78, or circumferential span 78, and shield 74 has a width or circumferential span 79 so that shield 74 is configured to completely cover slot 60 in the closed position thereof.

Figure 10:
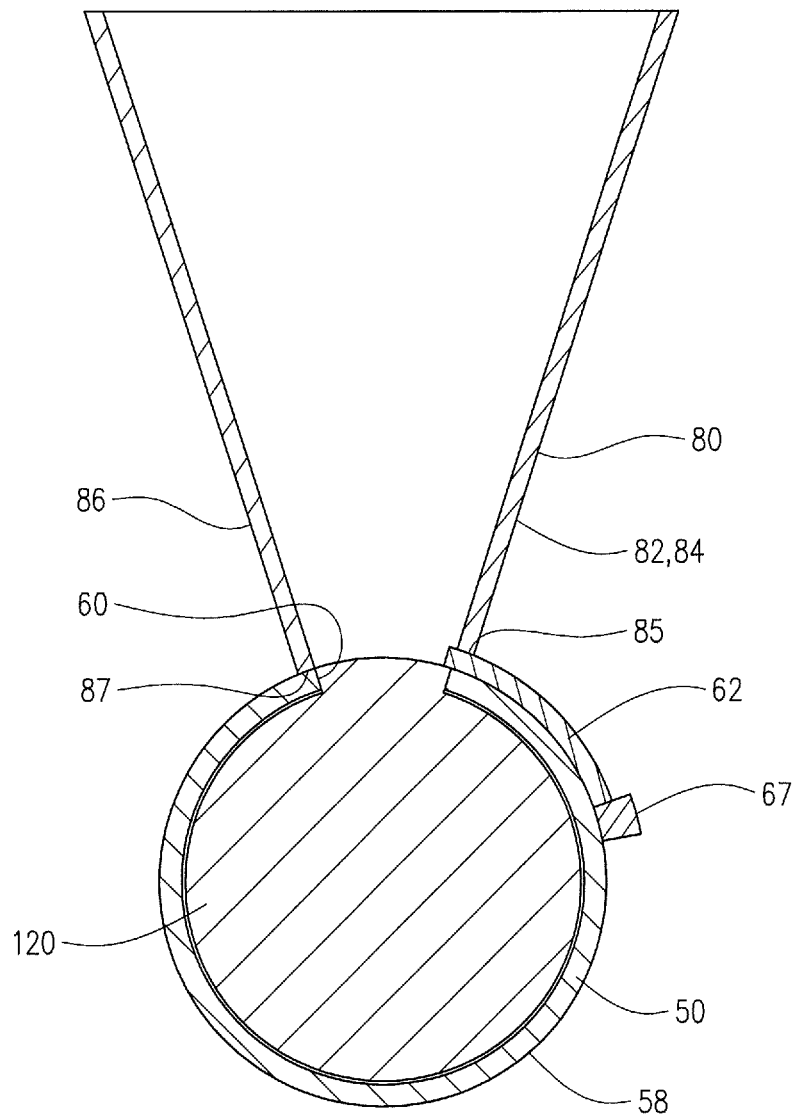
FIG. 10 is the identical cross section to FIG. 8 with the rotating gate valve in an open position.

Rotatable gate valve 62 is moveable between a closed position, shown in FIG. 8 and an open position as shown in FIG. 10. A stop 67 may be utilized to prevent over rotation of rotatable gate valve 62. In the open position injection tube 50 will receive additive through slot 60 from a hopper 80. Hopper 80 will receive an additive, for example, proppant from additive supply 32. While proppant and other dry additives are described as the additive in this disclosure, it is understood that gels or other fluids may likewise be supplied from additive injection apparatus 34. be the additive supplied from Hopper 80 comprises a pair of sloped sidewalls 82 which include first and second sidewalls 84 and 86. Stop 67 will prevent rotatable gate valve 62 from sliding out from beneath hopper 80 and more specifically from hopper wall 84. First sidewall 84 has a lower edge 85 and second sidewall 86 has lower edge 87. Hopper 80 likewise has end walls 88, which comprise first and second end walls 90 and 92 with lower edges 91 and 93 respectively. Sidewalls 82 and end walls 88 define an opening 94 at the upper end thereof through which additive may be received.

Lower edge 87 is welded or otherwise connected to the outer wall 58 of injection tube 50. Lower edge 85 of first sidewall 84, lower edge 91 of first end wall 90 and lower edge 93 of second end wall 92 are spaced from outer wall 58 to provide for the rotation of rotating gate valve 62 between open and closed positions. The length of the weld or other connections at lower edge 87 of sidewall 86 is such that it will fit between first and second end rings 70 and 72 of rotatable gate valve 62. Sidewall 86 may extend beyond the weld, but will be spaced from injection tube 50 to fit over rotating gate valve 62 as shown in FIG. 9, to allow for rotation of gate valve 62. As shown in FIG. 8, when in the closed position, the rotating gate valve 62 will slide underneath sidewall 84. Rotatable gate valve 62 will likewise slide underneath walls 90 and 92. Preferably, there is a close enough fit underneath end walls 90 and 92 such that no additive can escape therethrough when rotating gate valve 62 is in the closed position. In the open position shown in FIG. 10, the rotating gate valve 62 is rotated so that additive can fall through slot 60 into injection tube interior 56. As is shown in FIG. 10, the rotating gate valve 62 does not slide completely away from edge 85 of sidewall 84 such that it will fill the space between injection tube 50 and hopper 80 when additive is being supplied to injection tube 50. Once the injection tube 50 is filled, rotating gate valve 62 may be rotated back to the closed position.

Injection tube 50 is connected at its second end 54 thereof to a gate valve 100. Gate valve 100 may comprise a gate valve housing 102, which has outer walls 104 defining a space 106 therebetween. Housing 102 has upper and lower ends 108 and 110. A knife or plate gate 112 with upper and lower ends 114 and 116 is slidably received in space 106. Knife gate 112 has an opening, which may be a generally circular opening, 118 therethrough.

Figure 11:
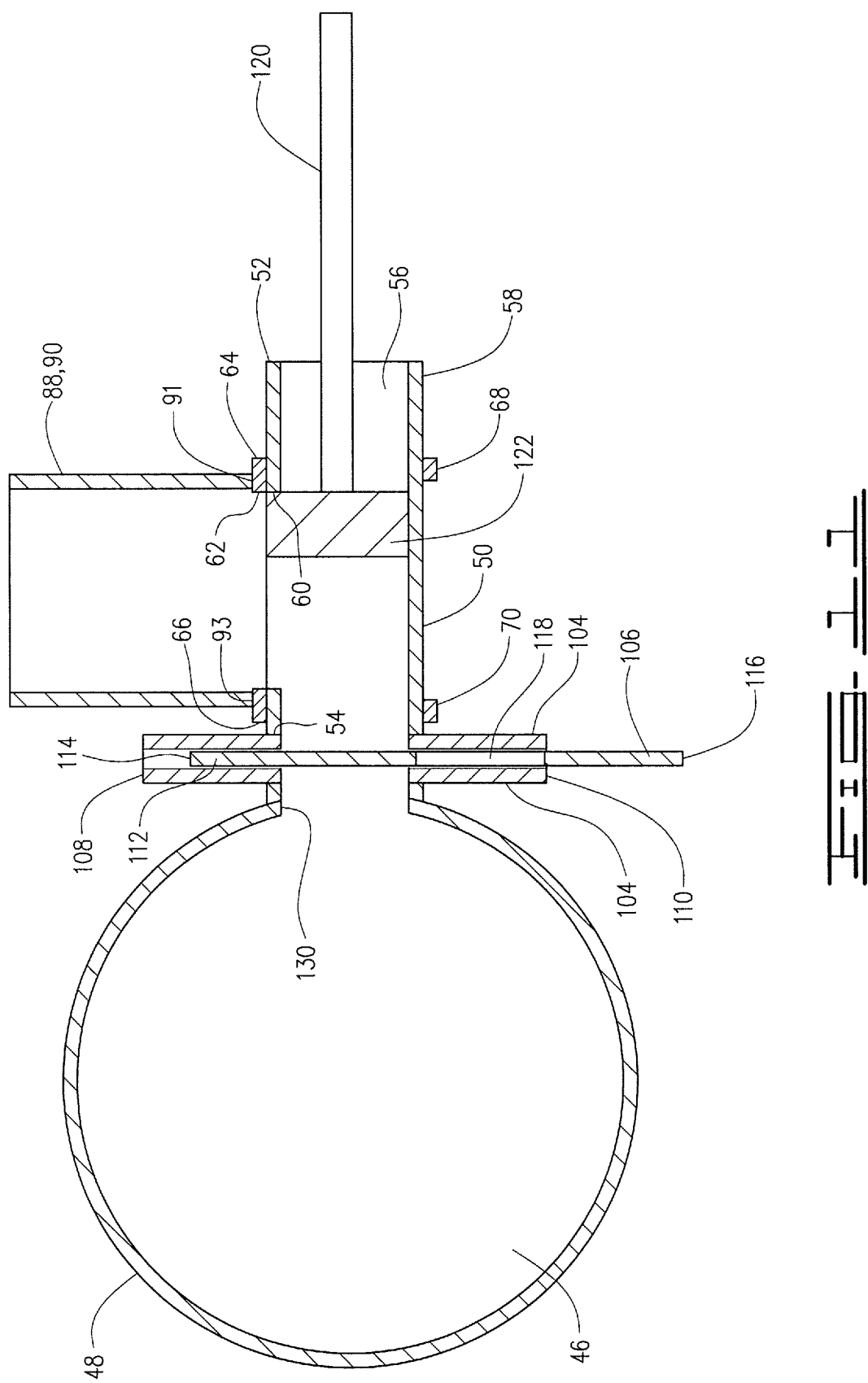
FIG. 11 is the identical cross section to FIG. 9 with the knife gate closed with the rotating valve open.

Knife gate 112 is moveable between open and closed positions to allow the additive in injection tube 50 to be plunged or urged into flow manifold 40 and mixed with the fluid therein for delivery into the well. FIG. 9 shows the knife gate valve 100 in the open position. To move to the closed position, the knife gate 112 is simply moved down so that the plate 112, as shown in FIG. 11 will block and prevent communication between the flow manifold 40 and the injection tube 50. FIG. 11 also shows rotatable valve 62 in the open position.

A plunger 120 is utilized to force additive from the injection tube 50 into flow manifold 40. Plunger 120, which may also be referred to as a piston, comprises a plunger rod 122 connected to plunger head 124. Plunger head 124 is a generally cylindrical shape with an arcuate extension 126 configured to slide within slot 60. The range of travel of plunger 120 is thus limited by the ends of slot 60.

Gate valve housing 102 is connected by welding or otherwise with connector 128 to the outer wall 48 of flow manifold 40. Connector 128 may be a generally circular connector, or other shape configured to circumscribe an opening 130 defined in wall 48 of flow manifold 40. Opening 130 allows the additive from injection tube 50 to be injected into flow manifold 40.

In operation, fluid from preblender 25 or other fluid source will be provided to the first end 42 of the flow manifold 40. Plunger 120 will initially be in a retracted position shown in FIG. 11 and the rotatable valve 62 will be in an open position. An additive such as proppant or other additive will be allowed to drop through slot 60 into the interior 56 of injection tube 50. Rotating valve 62 will move to the closed position as shown in FIG. 8 after the additive is dropped into injection tube 50. When additive is delivered through slot 60, the knife gate 112 will be in the closed position, such that communication between the interior or central flow passage 46 of flow manifold 40 and the injection flow passage 56 is prevented. When the rotatable gate valve 62 is moved to the closed position, the knife gate 112 is moved to the open position shown in FIG. 9. The plunger 56 is then urged toward the flow manifold 40 in injection tube 50, to move from the retracted to the injection position shown in FIG. 9. The additive is urged through opening 130 into central flow passage 46. The force with which the additive is urged into the central flow passage interior 46 is such that the additive is ejected from the injection tube 50 and injected into flow manifold 40. The mixture of the fluid and additive will be delivered through a pump or other means downhole for use as a fracturing or other treating fluid in the well.

After the plunger 20 has stroked to the insertion position, the gate valve 112 will be moved to the closed position, and plunger 120 will be moved to the retracted position and rotating gate valve 62 will be moved to the open position so that the process can be repeated. The process can be repeated as many times as necessary to create a continuous flow of fracturing fluid into the well.

There are a number of ways to rotate rotating valve 62 and move knife gate valve 100 between the open and closed positions. Likewise, any number of mechanisms may be utilized to reciprocate plunger 120. For example, a variety of motors are known in the oil industry and utilized for such purposes. Those might include hydraulic cylinders, rotary rack and pinion motor combinations and other known mechanisms for opening and closing valves or creating rotating and reciprocating movements. In addition, while valves 62 and 100 are described as rotary and gate valves respectively, it is understood that other valves may be used. For example valve 62 may be a gate valve and valve 100 may be a rotatable valve. Any valve capable of being moved between open and closed positions as described herein may be used.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. Additive injection apparatus comprising:
   a flow manifold;
   an injection tube having a tube wall defining a slot in the tube wall, wherein the injection tube is configured to communicate an additive into the flow manifold;
   an additive hopper connected to the injection tube;
   a first valve moveable between open and closed positions, wherein when the first valve is in the open position the additive may be communicated from the additive hopper to the injection tube, wherein the first valve is a rotatable gate valve having a shield extending between a first ring and a second ring, the first ring and second ring disposed about the injection tube such that in the closed position the shield covers the slot to prevent the additive being communicated from the hopper to the injection tube and in the open position the shield is position so as to allow the additive to be communicated from the hopper into the injection tube;
   a second valve moveable between open and closed positions, wherein when the second valve is in the open position the additive may be communicated from the injection tube into the flow manifold; and
   a reciprocable plunger disposed in the injection tube, the reciprocable plunger having a cylindrical shape with an arcuate extension such that the arcuate extension slides within the slot of the injection tube.

2. The additive injection apparatus of claim 1, wherein additive is communicated into the injection tube from the hopper when the reciprocable plunger is in a retracted position.

3. The additive injection apparatus of claim 1, wherein the reciprocable plunger is configured to urge additive from the injection tube into a fluid flowing through the flow manifold.

4. The additive injection apparatus of claim 1, wherein the second valve comprises a reciprocable gate valve movable between the open and closed positions.

5. An injection apparatus comprising:
   a flow manifold defining a central flow passage;
   an injection tube having a tube wall defining an interior and a slot in the tube wall, the injection tube interior being communicable with the central flow passage of the flow manifold for urging an additive into fluid flowing in the central flow passage;
   a hopper communicated with the injection tube interior through the slot in the tube wall of the injection tube; and
   a first valve interposed between a hopper interior and the injection tube interior configured to selectively allow and prevent additive from being communicated from the hopper interior to the injection tube interior, wherein the first valve is a rotatable valve having a shield extending between a first ring and a second ring, the first ring and second ring disposed about the injection tube such that in the closed position the shield covers the slot to prevent the additive being communicated from the hopper to the injection tube and in the open position the shield is positioned so as to allow the additive to be communicated from the hopper into the injection tube.

6. The injection apparatus of claim 5, further comprising a second valve interposed between the central flow passage and the injection tube interior.

7. The injection apparatus of claim 6, wherein the second valve is a reciprocating gate valve.

8. The injection apparatus of claim 5, further comprising a reciprocable plunger disposed in the injection tube.

9. The injection apparatus of claim 8, wherein the reciprocable plunger moves from a retracted to an inserted position to urge additive from the injection tube into the central flow passage.

10. Additive injection apparatus for use in a frac blending unit comprising:
    a flow manifold defining a central flow passage having an inlet and an outlet;
    an injection tube having a tube wall and defining an interior and a slot in the tube wall, the injection tube being connected to the flow manifold and configured to introduce an additive into the flow manifold;
    a reciprocable valve interposed between central flow passage and an injection tube interior; the injection tube has a rotatable valve for receiving the additive into the injection tube, the rotatable valve having a shield extending between a first ring and a second ring, the first ring and second ring disposed about the injection tube such that in the closed position the shield covers the slot and in the open position the shield is positioned so as to not cover the slot; and
    a plunger configured to urge the additive from the injection tube into a fluid flowing through the flow manifold, the plunger disposed in the injection tube, and the plunger having a cylindrical shape with an arcuate extension such that the arcuate extension slides within the slot of the injection tube.

11. The additive injection apparatus of claim 10, further comprising:

a hopper configured to communicate the additive into the injection tube through the slot in the tube wall of the injection tube; and the rotatable valve interposed between a hopper interior and the slot.

12. The additive injection apparatus of claim 10, wherein the plunger is reciprocable within the injection tube interior.

13. The additive injection apparatus of claim 12, wherein the injection tube interior is positioned at about 90° from the central flow passage.

14. The additive injection apparatus of claim 10, wherein the additive is a dry additive, and wherein a mixture of the dry additive and the fluid flowing through the central flow passage comprises a fracturing fluid delivered into a well through the outlet of the flow manifold.

15. The additive injection apparatus of claim 10, wherein the additive is a gel, and wherein a mixture of the gel and the fluid flowing through the central flow passage is delivered into a well through the outlet of the flow manifold.

\* \* \* \* \*